H. H. HATHAWAY.
SELF LOADING ATTACHMENT FOR AUTO TRUCKS.
APPLICATION FILED JAN. 20, 1915.
1,190,545.
Patented July 11, 1916.
2 SHEETS—SHEET 1.
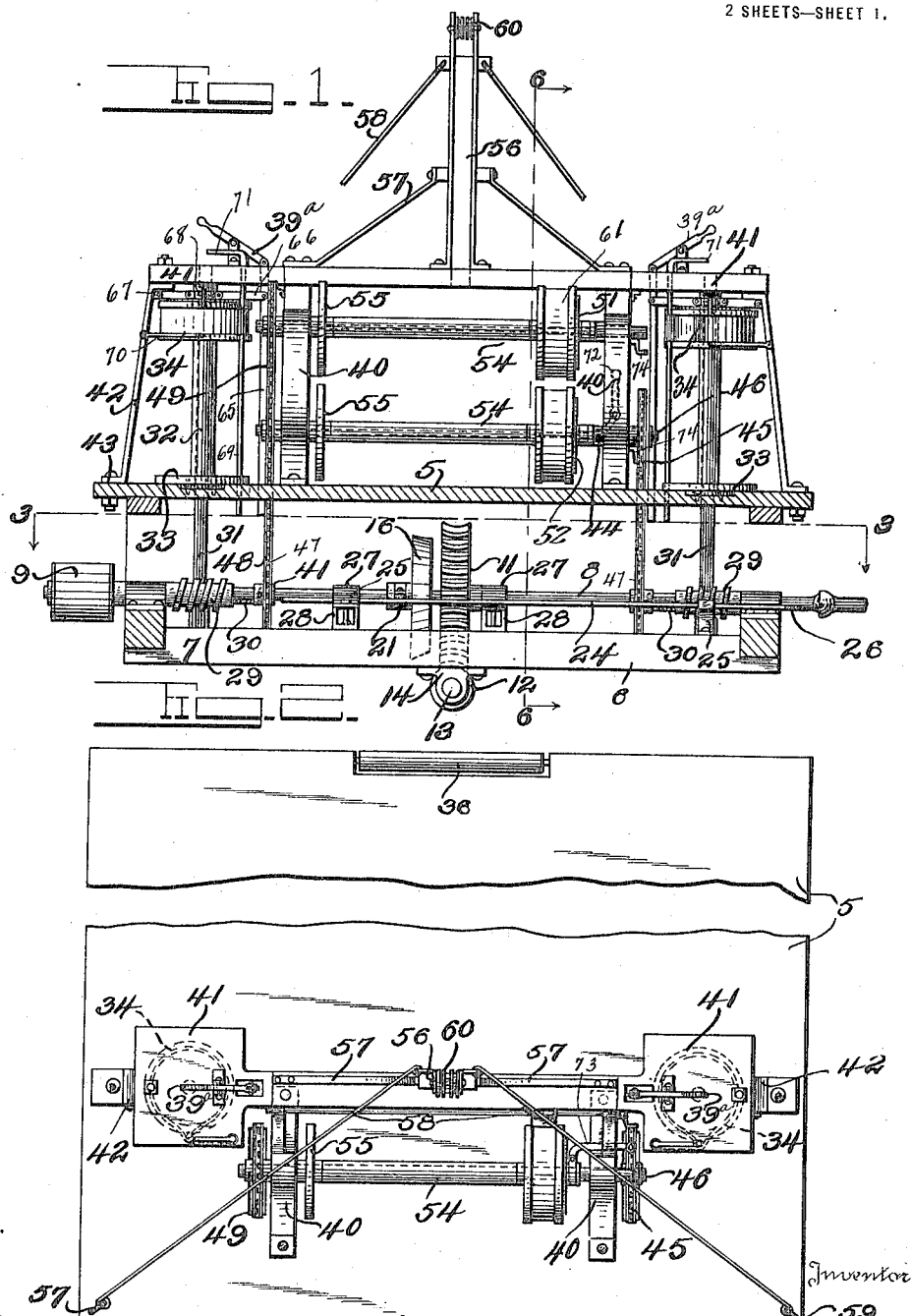

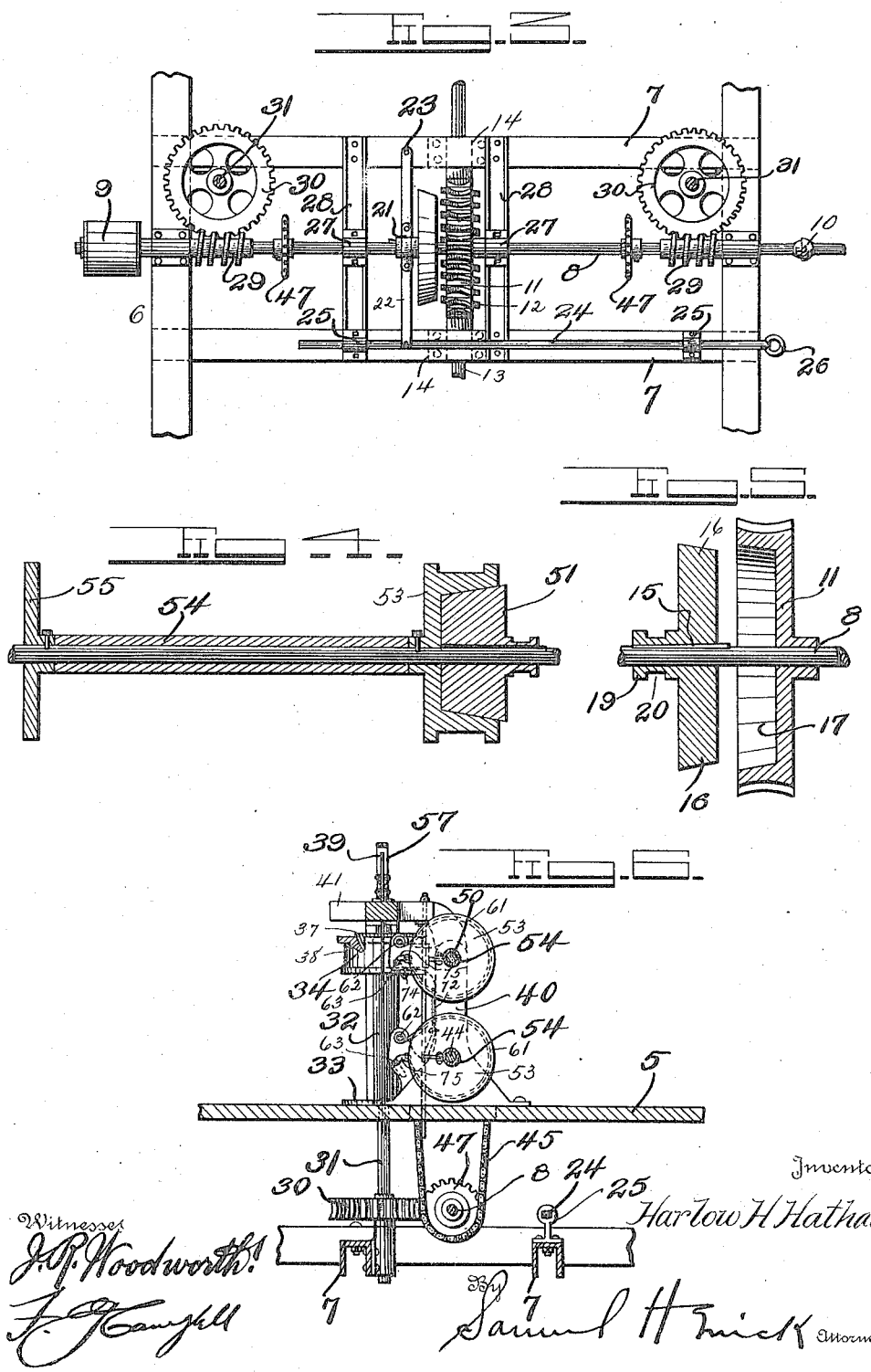

UNITED STATES PATENT OFFICE.

HARLOW H. HATHAWAY, OF PHOENIX, ARIZONA.

SELF-LOADING ATTACHMENT FOR AUTO-TRUCKS.

1,190,545.     Specification of Letters Patent.    Patented July 11, 1916.

Application filed January 20, 1915. Serial No. 3,288.

*To all whom it may concern:*

Be it known that I, HARLOW H. HATHAWAY, citizen of the United States of America, residing at Phoenix, in the county of Maricopa and State of Arizona, have invented certain new and useful Improvements in Self-Loading Attachments for Auto-Trucks, of which the following is a specification.

This invention relates primarily to a self loading attachment for automobiles or other self-propelled vehicles.

The object of the invention is to provide in an automobile or motor truck, an attachment which may be driven from the engine of said vehicle and will serve to draw or lift upon said vehicle any object such as a piano, safe, or the like that it is desired to load thereupon.

The invention in its broad aspect comprises a power transmission mechanism by the use of which it is possible to drive any machine whatever from the power plant of the automobile. By the use of this device circular saws, pumps, churns, washing machines, and many other devices may be driven from the power plant of the automobile.

Further objects and advantages of the invention will be set forth in the detailed description which now follows.

In the accompanying drawing, Figure 1 is a transverse sectional view through the body of an automobile, illustrating the attachment applied thereto. Fig. 2 is a plan view of the parts shown in Fig. 1. Fig. 3 is a plan view of that part of the mechanism which in Fig. 1 is shown mounted below the body of the vehicle. Fig. 4 is a longitudinal sectional view through one of the drums. Fig. 5 is detailed sectional view of the main driving gear, hereafter described, and Fig. 6 is a sectional view upon line 6—6 of Fig. 1.

Referring to the drawing the numeral 5 designates a platform or floor of an auto-truck. Supported below the platform 5 is the rectangular frame 6 made up of the channel iron indicated at 7. A shaft 8 extends transversely of frame 6 and has a pulley 9 mounted upon one end and a universal joint 10 mounted upon the other. The pulley 9 serves the purpose of driving such machines as have to be belted to the source of power, such for instance as washing machines, circular saws, or the like; while the universal joint 10 renders it possible to connect thereto various machines which do not have to be belted to the source of power but may be connected directly thereto. Mounted to rotate freely upon the shaft 8 is a worm wheel 11 which meshes with a worm 12 carried by the shaft 13, which shaft is a part of the main drive shaft of the automobile engine, not shown. The shaft 13 is mounted in bearings 14 carried by the frame 6. Splined upon the shaft 8 by a key 15 is a cone clutch member 16 which is adapted to enter a correspondingly shaped recess 17 formed in the body of the worm wheel 11. The clutch member 16 has a hub 19 that is provided with an annular recess 20. A yoke 21 engages this recess said yoke being a part of a lever 22 that is pivoted at 23 to a part of the frame 6. The opposite end of this lever is connected to a shifting rod 24 that is mounted to slide in bearing 25 of the frame 6. I have shown this rod provided with an operating handle 26 though it is to be understood that it may be operated from other points than that shown in the usual and well known manner of devices of this class. The shaft 8 is also supported in bearings 27 of supports 28 that form a part of the frame 6. The shaft 8 carries worms 29 which mesh with worm wheels 30 that are secured to vertical shafts 31. The shafts 31 pass through sleeves 32 which together with the flanges 33 and the brake drums 34, constitute drums upon which cables may be wound for drawing various objects toward and upon the platform or floor of the automobile. To aid in carrying out this object there is journaled in the rear end of the platform 5 a roller 36. Cone clutch members 37 are mounted to slide freely upon the shaft 31 and to enter correspondingly shaped recesses 38 formed in the brake drums 34. These cone clutch members may be actuated by yoke 68 and levers 39ᵃ in a manner which will be hereinafter set forth.

A frame comprising vertical members 40 and horizontal portions 41 is mounted upon the platform 5 and the upper ends of the shafts 31 are journaled in the portions 41 of this frame. Braces 42 extend from the outer ends of the portions 41 of the frame to the platform 5 and are secured to said platform at 43. A horizontal shaft 44 is journaled in the lower portion of the vertical members 40 of the frame and this shaft is driven by a sprocket chain 45 which passes over a sprocket 46 thereupon and over one of the sprocket wheels 47 on shaft 8. The other sprocket wheel 47 on shaft 8 has a sprocket chain 48 passing thereover which sprocket wheel in turn imparts motion to a sprocket wheel 49 that is secured to a horizontal shaft 50 journaled in the vertical frame members 40. Both of the shafts 44 and 50 have splined thereon cone clutch members 51 and 52 which are adapted to enter correspondingly shaped recesses in the brake drums 53. These brake drums together with sleeves 54 and flanges 55 constitute drums over which cables may pass and upon which cables may be wound for use in various relations. These cables may be used to draw objects to and upon the platform 5 or they may be used in conjunction with a derrick which is mounted upon the top of the frame comprised by the members 40 and 41 and the standard of which derrick is indicated at 56. This standard is supported by braces 57 which extend between said standard and the top of the frame comprised by members 40 and 41. In addition to the braces 57 guy rods or cables 58 extend from the upper part of the standard 56 to and are secured to the edges of the platform 5 at 59. The upper end of the standard 56 carries sheaves or pulleys 60 over which cables may pass so that this part of the structure constitutes a derrick for lifting heavy objects.

The vertical and horizontal drums are substantially alike throughout. That is, each drum comprises a sleeve, a flange at one end, and a brake drum at the other which brake drum has a facial recess adapted to receive a cone clutch member which is fast upon the shaft that is driven to impart motion to the drum, the drum proper normally rotating freely with relation to this shaft but being clutched thereto by the cone clutch member in a manner that will be readily understood. Brake bands 61 are secured at one end as at 62 and are provided with means for tightening them such as the element 63 in a manner that is well known in devices of this character.

I wish it to be understood that I do not limit myself to the precise method of arranging the various operating levers for the several brake bands and clutch elements for these may be arranged in various ways to adapt them to the particular location in which they may be placed. I have however, conventionally illustrated operating means for the several cone clutch members and the brake bands. In the case of the vertical drums when the levers 39 are operated they shift rods 65 which slide vertically through the frame and have pivoted thereto the ends of levers 66. The opposite ends of these levers are pivoted to the frame at 67 and they are provided with yokes 68 which engage the cone clutch members 37 in the same manner that the yoke 21 engages the cone clutch member 16. For operating the brake bands of the vertical drums rods 69 are mounted to turn in the frame 41 and to these rods one end of each of the brake bands is connected. The opposite ends of these brake bands are fixed to brackets 70 of the frame, consequently when the rods 69 are turned through the medium of the handles 71 it follows that the brake bands will be tightened. In the case of the horizontal drums and referring particularly to the Figs. 1 and 6 it will be seen that the cone clutch members may be shifted endwise by the manipulation of a lever 72 in the case of the lower drum and by the manipulation of a handle 73 in the case of the upper drums. The brake bands for these drums are fixed at 62 as hereinbefore set forth and the elements 63 are rock shafts which carry handles 74. When these handles are turned the rods 63 are turned and arms 75 of these rods draw upon the brake bands to tighten them, one end of each of the brake bands being connected to one of the arms 75.

While I have shown a pulley 9 mounted upon one end of the shaft 8 and a universal joint 10 mounted upon the other end of said shaft, it is to be understood that this shaft may be used for any purpose whatever in the driving of other machines or appliances from the power plant of the automobile and to this end it is understood that I may mount upon said shaft whatever driving appliances may be necessary to carry out the desired results. It is also to be understood that while I have shown the rectangular frame supported beneath the bed of the truck and that while I have shown the winding drums supported upon the top of the bed, the various devices shown and described may be located in any feasible place or position upon the automobile so long as they are located in such position as to be brought into driving connection with the power plant of the automobile and to serve the purposes for which they are intended. It is to be furthermore understood that while I have shown a plurality of drums arranged to be operated from the power plant of the automobile, a single drum may be used when it is found to be desirable without departure from the invention and that where more than one drum is used these drums are not necessarily operated in unison but one may be operated independent of the other. It is furthermore to be understood that various changes may be made in the arrangement of the supporting frame of the drum and that any frame construction may be employed which will suitably mount the various drums or any of them. Furthermore the position of the derrick with relation to the drum may be varied at will so long as the derrick is maintained in operative relation to the drum.

While the elements shown and described are well adapted to serve the purposes for which they are intended, it is to be understood that the invention is not limited to the precise construction set forth, but includes within its purview such changes as may be made within the scope of the appended claim.

Having described my invention, what I claim is:

The combination with a self-propelled vehicle comprising a body portion, of a frame mounted transversely of said body at the forward end thereof, a derrick supported above said frame, a horizontally disposed winding drum for said derrick mounted in said frame, a vertically disposed winding drum mounted in said frame, means for driving said horizontally disposed winding drum from the power plant of the vehicle through the medium of reducing gearing, and means for driving the said vertically disposed drum from said power plant of the vehicle at a much greater reduction in speed than the horizontal drum is driven.

In testimony whereof I affix my signature in the presence of two witnesses.

HARLOW H. HATHAWAY.

Witnesses:
 FRANK LOUN,
 LESTER EWING.

Copies of this patent may be obtained for five cents each, by addressing the "Commissioner of Patents, Washington, D. C."